United States Patent [19]

Kung

[11] Patent Number: 5,442,342
[45] Date of Patent: Aug. 15, 1995

[54] DISTRIBUTED USER AUTHENTICATION PROTOCOL

[75] Inventor: Kenneth C. Kung, Cerritos, Calif.

[73] Assignee: Hughes Aircraft Company, Los Angeles, Calif.

[21] Appl. No.: 77,133

[22] Filed: May 27, 1993

Related U.S. Application Data

[63] Continuation of Ser. No. 832,645, Feb. 10, 1992, abandoned, which is a continuation of Ser. No. 574,640, Aug. 29, 1990, abandoned.

[51] Int. Cl.$^6$ .............................................. G06K 5/00
[52] U.S. Cl. ........................... 340/825.34; 340/825.31; 235/382
[58] Field of Search ...................... 340/825.31, 825.34; 235/380, 279, 382, 382.5; 364/408

[56] References Cited

U.S. PATENT DOCUMENTS

| | | | |
|---|---|---|---|
| 4,305,060 | 12/1981 | Apple et al. | 340/825.34 X |
| 4,317,957 | 3/1982 | Sendrow | 235/379 |
| 4,590,470 | 5/1986 | Koenig | 340/825.31 |
| 4,672,533 | 6/1987 | Noble et al. | 340/825.34 |
| 4,675,815 | 6/1987 | Kuroki et al. | 340/825.32 |
| 4,951,249 | 8/1990 | McClung et al. | 340/825.34 |

Primary Examiner—Donald J. Yusko
Assistant Examiner—Edwin C. Holloway, III
Attorney, Agent, or Firm—W. K. Denson-Low

[57] ABSTRACT

A distributed authentication system that prevents unauthorized access to any computer system in a distributed environment. Authentication using the present invention involves three distinct phases. In the first phase, user passwords are generated by the computer system and encrypted on a coded card together with a message authentication code to prevent alterations prior to any access attempts. These are complex and impersonal enough not to be easily guessed. This coded card must be used whenever requesting access to the system. Second, in addition to supplying a password, the user is required to correctly respond to a set of randomly selected authentication challenges when requesting access. The correct responses may vary between the right response, a wrong response or no response depending on some predetermined variable, e.g., the day of the week or hour of the day. The dual randomness thus introduced significantly reduces the usefulness of observed logon information. Third, at random times during the session, the user is required again to respond to selected authentication challenges. This detects piggybacking attempts. Since authentication depends on the correctness of the entire set of responses rather than on the response to a single question, the present invention provides a significant increase in the probability of detecting and preventing unauthorized computer access.

9 Claims, 2 Drawing Sheets

DISTRIBUTED USER AUTHENTICATION PROTOCOL

This is a continuation of application Ser. No. 07/832,645, filed Feb. 10, 1992, now abandoned which is a continuation of application Ser. No. 07/574,640 filed Aug. 29, 1990, now abandoned.

BACKGROUND

The present invention relates to authorized user recognition in a distributed computer system and, more particularly, to the use of computer passwords and other computer user recognition protocols.

There is an inherent danger in any computer system where intruders, using normal channels, may access sensitive or classified information for malicious purposes. Unauthorized users can cause many problems for computer systems. They may modify software to cause unwanted events to occur or to benefit themselves. They may access private or classified data, copy proprietary software, etc. While doing all this, they can seriously impact all computer-based operations when their use of computer resources causes deterioration of response times or denial of service for legitimate users. Such access can be accomplished in a number of ways, e.g., the user claims to be someone else, the user diverts the access path to another computer system, the user accesses the system before a legitimate user logs off, and the like.

Access can be gained by persons who observe a legitimate logon session within an open communication network and later masquerade as that legitimate user by using the information seen. Simple, user-selected and often personally related passwords can be "guessed" by intruders or programs written by them. Legitimate sessions may be recorded from the communication network for later playback or an intruder may "piggyback" a legitimate session by using the system before the user has logged out.

To guard against such attacks, the system must protect itself by authenticating its users. Passwords and authentication responses can also be obtained by collusion or surreptitious means. These are outside the scope of the authentication process. The present invention's effectiveness against that type of an attack is limited to the case where only an incomplete set of responses was obtained and thus tests are failed.

The use of passwords to authenticate users is the most prevalent means of controlling access currently in use. In many cases, the users select their own passwords or continue to use the group password. Studies have shown that most users select passwords that are easy to remember, generally personal in nature and seldom change them. Under these circumstances, they are easy to guess either by a motivated individual or a simple program using a random word generation technique.

Some systems may use an authentication means such as requesting the user to supply a sequence of names, etc. in conjunction with a password. This makes entry more difficult but is still vulnerable if the logon procedure is observed and the response identified or the expected response is easy to guess. Neither the authentication mechanism nor the password scheme provide the protection against piggybacking, the use of a system before a legitimate user logs off, imbedded in the present invention.

Accordingly, there is a need for a foolproof means of recognizing and authenticating an authorized user in a computer system.

SUMMARY OF THE INVENTION

In accordance with these and other objectives and features of the present invention, there is provided a distributed authentication system that prevents unauthorized access to any computer system in a distributed environment. Restriction of access is a major step in preventing destructive modification of software or data, improper release of sensitive/classified information, and misuse of computer system resources. One unique feature of the present invention is the use of multiple, randomly selected authentication or challenge mechanisms and a wide variety of correct answers. "Correct" answers may include right, wrong, or no responses. Since authentication depends on the correctness of the entire set of responses rather than on the response to a single question, the present invention provides a significant increase in the probability of detecting and preventing unauthorized computer access.

Authentication using the present invention involves three distinct phases. In the first phase, user passwords are generated by the computer system and encrypted on a coded card together with a message authentication code to prevent alterations prior to any access attempts. These are complex and impersonal enough not to be easily guessed. This coded card must be used whenever requesting access to the system. Second, in addition to supplying a password, the user is required to correctly respond to a set of randomly selected authentication challenges when requesting access. The correct responses may vary between the right response, a wrong response or no response depending on some predetermined variable, e.g., the day of the week or hour of the day. The dual randomness thus introduced significantly reduces the usefulness of observed logon information. Third, at random times during the session, the user is required again to respond to selected authentication challenges. This detects piggybacking attempts.

The authentication invention described herein performs these functions in a distributed as well as a centralized environment. It employs pairs of authentication boxes, coded cards, passwords and a selection of challenges. Distributing responsibility for authentication between the user node and the computer system permits a user to access different computer systems from a single user node. The only restriction is that the user must possess one or more coded cards generated by the computer(s) to be accessed. The challenges used are selected at random for each authentication session. Responses to the challenges can also be varied. At one time, a true response may be expected. At another, no answer or a false answer may be the correct response. The pattern of these responses can be varied by basing their selection on a parameter such as day of the week, if desired. Access is granted based on reception of correct responses to the entire set of challenges. Users are required to remember their password and the valid pattern of response to gain access to the system. Care must be taken that the response patterns are easy enough to remember so that users will not be tempted to record them in an unsafe location.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
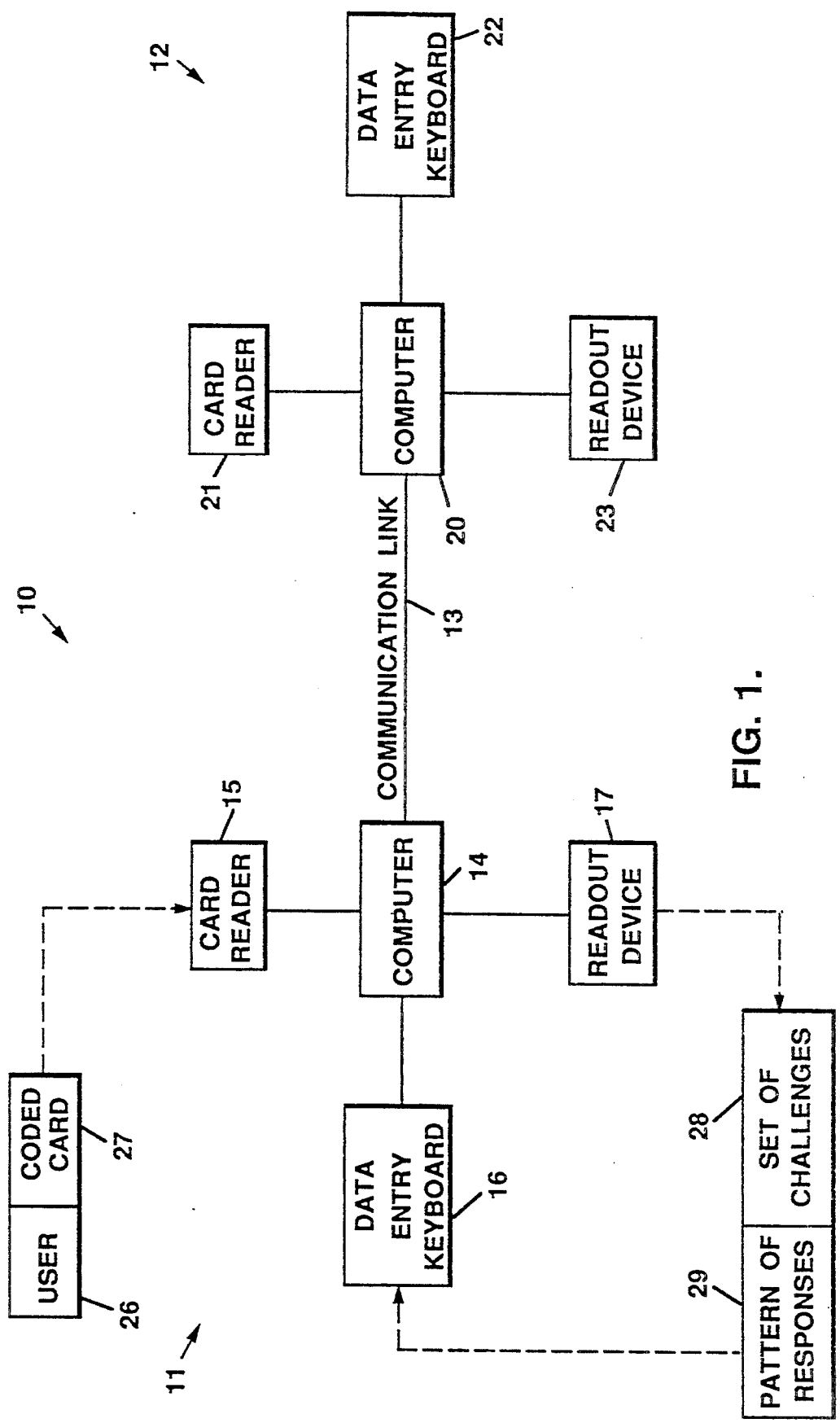
FIG. 1 is a block diagram of a simplified computer system employing the principles of the present invention.

Referring to the drawings, FIG. 1 is a block diagram of a simplified exemplary arrangement of physically separated computer installations electrically interconnected to form a distributed computer system 10. The distributed computer system 10 comprises a first terminal 11 and a second terminal 12 interconnected by a communication link 13. The first and second terminals 11, 12 are physically separated, and may be on different continents, or in different rooms of the same building. The communication link 13 may comprise wires or coaxial cables, a microwave link, or a path by way of a communication satellite or communication network. The first terminal 11 comprises a computer 14 connected to a card reader 15, a data entry keyboard 16 and a readout device 17. Similarly, the second terminal 12 comprises a computer 20 connected to a card reader 21, a data entry keyboard 22 and a readout device 23. The computers 14, 20 may be any conventional unit such as an IBM, MacIntosh or any mainframe. The card readers 15, 21 may be a box with a card slot and a magnetic reader inside or an optical reader for reading a bar code printed on the card, or any other suitable card reading arrangement. The data entry keyboard 16, 22 may be a keypad or a conventional computer keyboard, or the like. The readout device 17, 23 may be a liquid crystal display, a cathode ray tube monitor or a hard copy printer.

In operation, a user 26 approaches the first terminal 11 and presents a coded card 27 to the card reader 15. The card reader 15 reads the code on the card 27. The computer 14 verifies the authenticity of the card 27 by checking the code against authentication data stored in card 27. If authentic, the computer 14 requests a password by way of the readout device 17. The user 26 enters the password by way of the data entry keyboard 16. The computer 14 compares the password with a password stored on the coded card 27. If not authentic, communications are terminated.

If the password is authentic, the computer 14 at the first terminal 11 initiates communications with the computer 20 at the second terminal 12. After a handshaking and authentication protocol has been completed, the computers 14, 20 have authenticated each other, and a trusted path now exists between them.

The computer 20 at the second terminal 12 now proceeds to present a set of challenges 28 via the readout device 17 at the first terminal 11. The user 26 responds to the challenges 28 via the data entry keyboard 16 at the first terminal 11. The computer 20 at the second terminal 12 compares the pattern of responses 29 given with a stored pattern of responses 29 agreed upon ahead of time. It is a feature of the present invention that the correct pattern of responses 29 includes some "wrong answers" given on purpose. For a set of five challenges 28, it may be agreed upon ahead of time that three of the responses 29 will be right, and that two of the responses 29 will be wrong. The set of challenges 28 and the pattern of responses 29 are deliberately made easy to avoid the need for writing them down as a memory aid. The key is in the agreed upon pattern of responses 29. Seven out of ten right —any seven—or a particular seven. The pattern of responses 29 can vary from day-to-day or from morning to afternoon. The pattern of responses 29 can be different for each user. When there are two or more distant terminals to be accessed, the recognition pattern of responses 29 can be different as one user accesses different terminals.

The present invention prevents unauthorized access to any computer system in a distributed environment. Restriction of access is a major step in preventing destructive modification of software or data, improper release of sensitive/classified information, and misuse of computer system resources. One unique feature of the present invention is the use of multiple, randomly selected authentication mechanisms and a wide variety of correct answers. "Correct" answers may include right, wrong, or no responses. Since authentication depends on the correctness of the entire set of responses rather than on the response to a single question, the present invention provides a significant increase in the probability of detecting and preventing unauthorized computer access.

Authentication using the present invention involves three distinct phases. In the first phase, user passwords are generated by the computer system and encrypted on a coded card together with a message authentication code to prevent alterations prior to any access attempts. These are complex and impersonal enough not to be easily guessed. This coded card must be used whenever requesting access to the system. Second, in addition to supplying a password, the user is required to correctly respond to a set of randomly selected authentication challenges when requesting access. The correct responses may vary between the right response, a wrong response or no response depending on some predetermined variable, e.g., the day of the week or hour of the day. The dual randomness thus introduced significantly reduces the usefulness of observed logon information. Third, at random times during the session, the user is required again to respond to selected authentication challenges. This detects piggybacking attempts.

The authentication invention described herein performs these functions in a distributed as well as a centralized environment. It employs pairs of authentication boxes, coded cards, passwords and a selection of challenges. Distributing responsibility for authentication between the user node and the computer system permits a user to access different computer systems from a single user node. The only restriction is that the user must possess one or more coded cards generated by the computer(s) to be accessed. The challenges used are selected at random for each authentication session. Responses to the challenges can also be varied. At one time, a true response may be expected. At another, no answer or a false answer may be the correct response. The pattern of these responses can be varied by basing their selection on a parameter such as day of the week, if desired. Access is granted based on reception of correct responses to the entire set of challenges. Users are required to remember their password and the valid pattern of response to gain access to the system. Care must be taken that the response patterns are easy enough to remember so that users will not be tempted to record them in an unsafe location.

Figure 2:
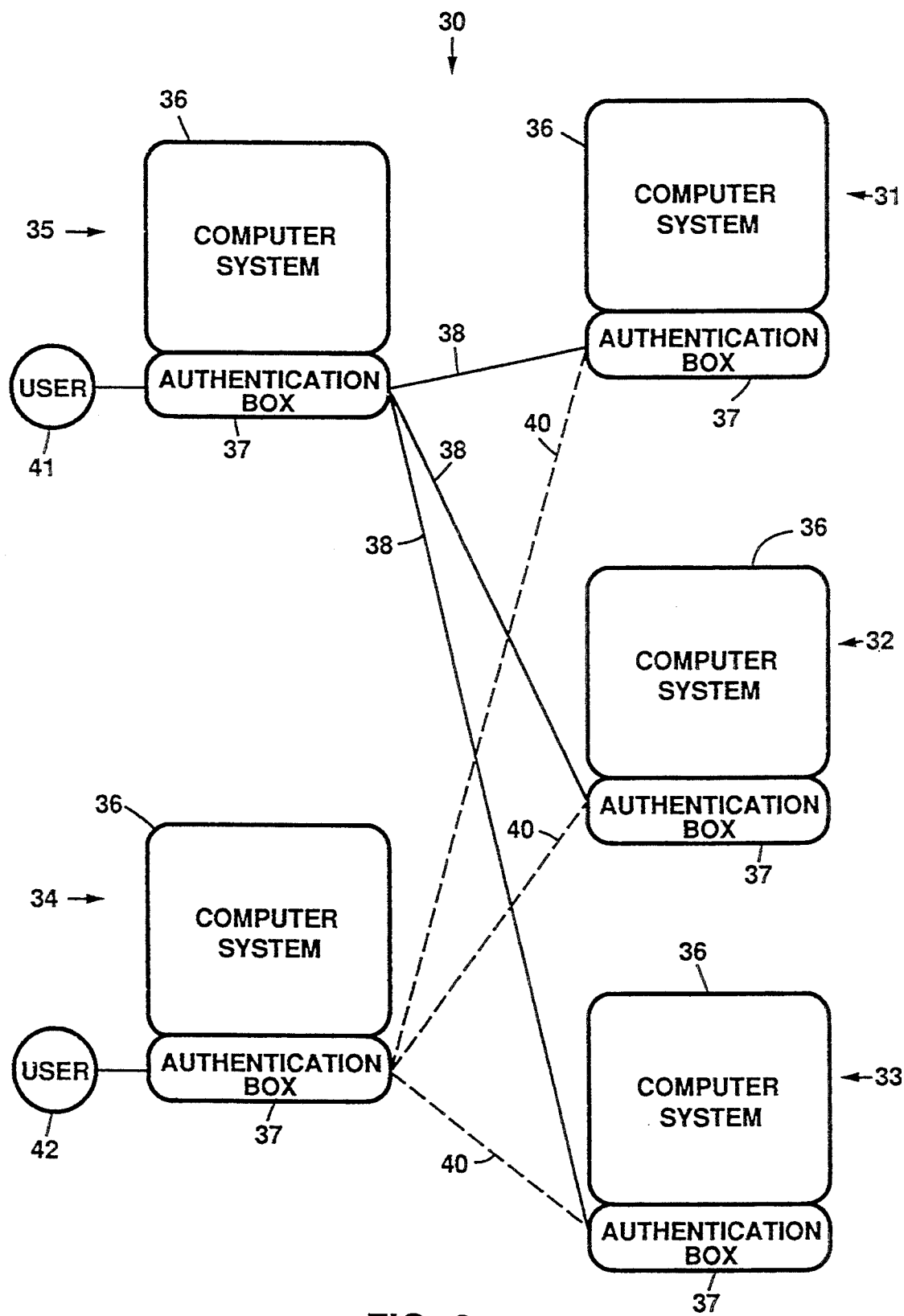
FIG. 2 is a diagram of a second embodiment of the distributed computer system employing the principles of the present invention.

FIG. 2 illustrates a second example of an operational arrangement. In this system, the user can access any computer in a distributed system from a single node provided that he possesses a coded card containing a password generated by that computer.

FIG. 2 is a block diagram of another embodiment of a distributed computer system 30 having five nodes 31, 32, 33, 34, 35. Each node 31, 32, 33, 34, 35 is comprised of a computer system 36 and an authentication box 37. In the present example, the authentication box 37 at the fifth node 35 has communication links 38 to the authentication boxes 37 at the first, second and third nodes 31, 32, 33. Similarly, the authentication box 37 at the fourth node 34 has communication links 40 to the authentication boxes 37 at the first, second and third nodes 31, 32, 33. A first user 41 is located at the fifth node 35, and a second user 42 is located at the fourth node 34. Since authentication boxes 37 are colocated with their respective computer system 36, the path between each box 37 and its computer system 36 is considered to be trusted.

The following describes the operation. Protection against fraudulent responses to messages sent over the communication links 38, 40 is provided through the use of time stamps and sequence numbers. An intruder cannot decrypt a message in time to generate a response within the acceptable time window or determine the proper sequence number for the set that applies.

Prior to the start of communications, the first node 31 must: (a) generate two asymmetric keys: AKc which is stored on the user's card and AKx which is stored in the first node 31 associated with the user's password file, and (b) generate a card to be carried by the first user 41 using a private key (PKcard). This card contains the user name, encrypted password, AKc, Message Authentication Code (MAC).

To initiate a session, the first user 41 presents a card to the authentication box 37 at fifth node 35. The fifth node 35 authenticates the card by checking the MAC. If authentic, the fifth node 35 authenticates the first user 41 by requesting the password, encrypting it and comparing it with the password stored on the card. If not authentic, communications are terminated. If authentic, the fifth node 35 sends a message to the authentication box 37 at the first node 31 encrypted with the public code of the first node 31 and containing the certificate of the fifth node 35, a date/time stamp, a sequence number, a random number generated by the fifth node 35 and a MAC. If not authentic, communications are terminated.

The first node 31 decrypts the message and verifies that the fifth node 35 is not on the list of compromised authentication boxes 37 furnished by the an authority designated as the Key Management Center. If the fifth node 35 is on this list, the first node 31 considers the card for the first user 41 also to be compromised and terminates communications. If the fifth node 35 is not on this list, the first node 31 checks the time stamp to determine if it is within a predetermined window. If not, the message is considered invalid and communications are terminated. If valid, the first node 31 checks the sequence number to verify that it is in consecutive order for the fifth node 35. If not, the message is considered invalid and communications are terminated. If valid, the first node 31 sends a message to the fifth node 35 encrypted with the public key of the fifth node 35 and containing the certificate of the first node 31, a date/time stamp, a sequence number, the random number generated by the fifth node 35 and a MAC.

The fifth node 35 decrypts the message and performs the same time stamp and sequence number tests as discussed in the last paragraph. If not passed, communications are terminated. If passed, the fifth node 35 generates a traffic encryption key TEKab using both certificates and the random number. At this point, the fifth node 35 and the first node 31 have authenticated each other and a trusted path now exists between them.

Using the traffic encryption key TEKab, the first node 31 sends a message to the fifth node 35 containing a request for the password of the first user 41 and a MAC. The fifth node 35 requests the password of the first user 41. The first user 41 enters a clear test password. The fifth node 35 encrypts the password then using TEKab to send it to the first node 31 with a MAC. The first node 31 compares the encrypted password with the one stored in the first node 31. Only three attempts to enter a password are allowed. If three failures occur, the session is terminated.

If the password is accepted, the first node 31 downloads challenges from its authentication box 37 to the fifth node 35. The authentication box 37 at the first node 31 selects the challenges randomly and sends a message to the fifth node 35 encrypted with TEKab containing the challenge/response phrases and a MAC. The preceding step is repeated a random number of times with different authentication challenges. Only one opportunity is allowed for response to each challenge. The fifth node 35 sends a message encrypted with TEKab containing the sequence of passed/failed challenges of the first user 41 and a MAC. If first user 41 has failed to supply the proper sequence of passed/failed challenges, the session is terminated. The first node 31 repeats authentication requests at intervals during the session to provide continuous authentication. Whenever the session terminates, the fifth node 35 will destroy all downloaded information and notify the first node 31 when completed using TEK for encryption.

Thus there has been described a new and improved method for recognizing an authorized user in a computer system. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. In a method for authenticating an authorized user for a computer controlled system, said method being of the type wherein a coded card containing an authentication code and a user password is inserted by the user into a reader coupled to the computer controlled system, and wherein the computer then verifies the authenticity of the card by checking the authentication code against authentication data stored on the coded card, and wherein the computer also compares a password entered into a data entry device with the user password on the coded card, the improvement comprising the following steps for authorization of access after verification of the user password:

providing a set of challenges to be answered by the user, each challenge having a right answer and at least one wrong answer;

storing a predetermined pattern of responses to said challenges, said predetermined pattern defining an authenticating response to said set of challenges, said predetermined pattern including a deliberately wrong answer to at least one of said challenges and a right answer to at least a remaining one of said challenges comprising said set;

sequentially presenting said set of challenges via a readout device to the user;

permitting the user to respond sequentially to each challenge of the set of challenges via the data entry device, wherein the sequential set of user responses to said set of challenges defines a user-entered pattern of responses;

comparing said user-entered pattern of responses to said predetermined pattern defining said authenticating response and permitting entry to said computer controlled system if and only if said user-entered pattern of responses matches said authentication pattern.

2. The improvement as recited in claim 1 wherein said predetermined authenticating response further includes said user not responding to at least one of the challenges, wherein said user is permitted access to the computer controlled system only if said user-entered pattern of responses further includes no user response entered via the data entry device to said at least one challenge.

3. The method as recited in claim 1 wherein said set of challenges are randomly selected.

4. The method as recited in claim 1 further comprising the step of requiring the user to respond to additional authentication challenges at random times during said access to the computer system to maintain access, said additional authentication challenges sequentially presenting a set of challenges via a readout device to the user, an authenticating response to the set of challenges being previously determined, the authenticating response including a wrong answer to at least one of the challenges and a right answer to each of the other challenges;

the user responding sequentially to each of the set of challenges via the data entry device, an authenticating response to the set of challenges allowing the user to maintain access to the computer controlled system.

5. A method for authenticating an authorized user for a computer network having a first terminal and a second terminal coupled by a communication link, said method comprising the following steps:

insertion by the user of a coded card containing an authentication code and a user password into a reader coupled to the first of said terminals, said first terminal then verifying the authenticity of the card by checking the authentication code against authentication data stored on the coded card;

entry by the user of a password into a data entry device, said first terminal then verifying the authenticity of the password by checking the password against authentication data stored on the coded card, said first terminal initiating communication with the second terminal if the coded card and the password are authenticated;

determining a set of challenges to be answered by the user, each challenge having a right answer and at least one wrong answer;

storing a predetermined pattern of responses to said challenges, said predetermined pattern defining an authenticating response to said set of challenges, said predetermined pattern including a deliberately wrong answer to at least one of said challenges and a right answer to at least a remaining one of said challenges comprising said set;

the second terminal sequentially presenting said predetermined set of challenges to the user via a readout device;

permitting the user to respond sequentially to each challenge of the presented set of challenges via the data entry device, wherein the sequential set of user responses to said set of challenges defines a user-entered pattern of responses;

comparing said user-entered pattern of responses to said predetermined pattern defining said authenticating response and permitting entry to said computer controlled system if and only if said user-entered pattern of responses matches said authentication pattern.

6. The method as recited in claim 5 wherein said predetermined authenticating response also includes said user not responding to at least one of the challenges, wherein said user-entered pattern includes non-response by said user to said at least one of the presented challenges.

7. The method as recited in claim 5 wherein said plurality of challenges are randomly selected.

8. The method as recited in claim 5 further comprising the step of requiring the user to respond to additional authentication challenges at random times during access to the computer system to maintain access, said additional authentication challenges sequentially presenting a set of challenges via a readout device to the user, an authenticating response to the set of challenges being previously determined, the authenticating response including a wrong answer to at least one of the challenges;

the user responding sequentially to each of the set of challenges via the data entry device, an authenticating response to the set of challenges allowing the user access to the computer controlled system.

9. The method as recited in claim 8 wherein an authenticating response to said additional challenges includes a wrong answer to at least one of the challenges.

* * * * *